(12) United States Patent
Lefsrud et al.

(10) Patent No.: US 10,537,900 B2
(45) Date of Patent: Jan. 21, 2020

(54) ELECTROCYCLONIC PARTICLE COLLECTOR

(71) Applicant: THE ROYAL INSTITUTION FOR THE ADVANCEMENT OF LEARNING / MCGILL UNIVERSITY, Montreal (CA)

(72) Inventors: Mark Lefsrud, Hudson (CA); Yves Roy, Brossard (CA); Jennifer Ashfield, Ste-Anne-de-Bellevue (CA); Luc Roy, St-Jules de Beauce (CA)

(73) Assignee: TECH MACVERT INC., Montreal (CA)

( * ) Notice: Subject to any disclaimer, the term of this patent is extended or adjusted under 35 U.S.C. 154(b) by 130 days.

(21) Appl. No.: 15/568,872

(22) PCT Filed: Jan. 12, 2016

(86) PCT No.: PCT/CA2016/050024
§ 371 (c)(1),
(2) Date: Oct. 24, 2017

(87) PCT Pub. No.: WO2016/176757
PCT Pub. Date: Nov. 10, 2016

(65) Prior Publication Data
US 2018/0126389 A1 May 10, 2018

Related U.S. Application Data

(60) Provisional application No. 62/155,615, filed on May 1, 2015.

(51) Int. Cl.
*B03C 3/00* (2006.01)
*B03C 3/017* (2006.01)
(Continued)

(52) U.S. Cl.
CPC ............. *B03C 3/017* (2013.01); *B01D 45/16* (2013.01); *B03C 3/49* (2013.01); *A47L 9/122* (2013.01);
(Continued)

(58) Field of Classification Search
CPC .. B03C 3/017; B03C 3/41; B03C 3/49; B03C 3/15; B01D 45/16; B01D 45/12;
(Continued)

(56) References Cited

U.S. PATENT DOCUMENTS 4,116,790 A * 9/1978 Prestridge .......... B01D 17/0217
204/563
4,352,681 A * 10/1982 Dietz .................... B01D 45/12
96/61
(Continued)

FOREIGN PATENT DOCUMENTS

CA      1173764 A    9/1984
CA      2067388 A1   3/1992
(Continued)

OTHER PUBLICATIONS

Regulatory Impact Analysis (RIA) for Proposed Residential Wood Heaters NSPS Revision, Final Report, United States Environmental Protection Agency, Jan. 2014.
(Continued)

*Primary Examiner* — Dung H Bui
(74) *Attorney, Agent, or Firm* — Andrienne Bieber McNeil; ABM Intellectual Property Inc.

(57) ABSTRACT

An electrocyclonic particle collector (EPC) for removing particulate matter from a gas includes an EPC gas inlet, an EPC gas outlet, and an EPC gas flow path between the EPC gas inlet and the EPC gas outlet. A first section is downstream of the EPC gas inlet and includes a first cyclonic particle collector in the gas flow path for cyclonically
(Continued)

removing particles from the gas. A second section is in series with the first section and includes a rotational flow chamber in the gas flow path, and at least a first electrode in the gas flow path for facilitating electrostatic removal of particles from the gas stream in the rotational flow chamber.

16 Claims, 12 Drawing Sheets

(51) Int. Cl.
  *B03C 3/49* (2006.01)
  *B01D 45/16* (2006.01)
  *B04C 9/00* (2006.01)
  *B03C 3/41* (2006.01)
  *A47L 9/16* (2006.01)
  *A47L 9/12* (2006.01)
  *B03C 3/15* (2006.01)
  *B04C 11/00* (2006.01)
  *B01D 45/12* (2006.01)

(52) U.S. Cl.
  CPC ............. *A47L 9/1625* (2013.01); *B01D 45/12* (2013.01); *B03C 3/15* (2013.01); *B03C 3/41* (2013.01); *B04C 9/00* (2013.01); *B04C 11/00* (2013.01); *B04C 2009/001* (2013.01)

(58) Field of Classification Search
  CPC ..... B04C 2009/001; B04C 9/00; B04C 11/00; A47L 9/1625; A47L 9/122
  See application file for complete search history.

(56) References Cited

U.S. PATENT DOCUMENTS

| | | | | |
|---|---|---|---|---|
| 4,622,051 A | | 11/1986 | Polach et al. | |
| 4,649,703 A | * | 3/1987 | Dettling | B03C 3/011 |
| | | | | 60/275 |
| 6,017,381 A | * | 1/2000 | Dunn | B03C 3/15 |
| | | | | 95/3 |
| 6,355,178 B1 | * | 3/2002 | Couture | B01D 45/16 |
| | | | | 210/223 |
| 6,530,981 B2 | * | 3/2003 | Stivers | B01D 45/16 |
| | | | | 95/75 |
| 7,479,171 B2 | | 1/2009 | Cho et al. | |
| 7,964,021 B2 | | 6/2011 | Younsi et al. | |
| 2005/0028675 A1 | | 2/2005 | Conrad et al. | |
| 2010/0236012 A1 | * | 9/2010 | Horne | A47L 9/10 |
| | | | | 15/347 |
| 2012/0067214 A1 | * | 3/2012 | Ribera Salcedo | B03C 3/15 |
| | | | | 95/69 |
| 2014/0020558 A1 | | 1/2014 | Rao et al. | |

FOREIGN PATENT DOCUMENTS

| | | |
|---|---|---|
| CA | 2220233 A1 | 11/1996 |
| DE | 878636 | 6/1953 |
| EP | 0995494 A2 | 4/2000 |
| WO | 2004112938 A1 | 12/2004 |
| WO | 2008/147233 A2 | 12/2008 |
| WO | 2015/003252 A1 | 1/2015 |

OTHER PUBLICATIONS

Fundamentals of Air Pollution Engineering, Seinfeld et al., 1988, Chapter 7, p. 391-476.
Improving Energy Performance in Canada, Report to Parliament Under the Energy Efficiency Act for the Fiscal Year 2010-2011, Chapter 5.
Greenhouse, Sod and Nursery Industries, Statistics Canada, 2011.
2007 Census of Agriculture, US Department of Agriculture, Feb. 2009, p. 50, 58, 82, 110.
Canadian and Unites States Hearth Statistic, HPBA, 2014, https://www.hpba.org/Resources/Annual-Historical-Hearth-Shipments.
The Handbook of Biomass Combustion and Co-Firing, Van Loo et al., 2008.

* cited by examiner

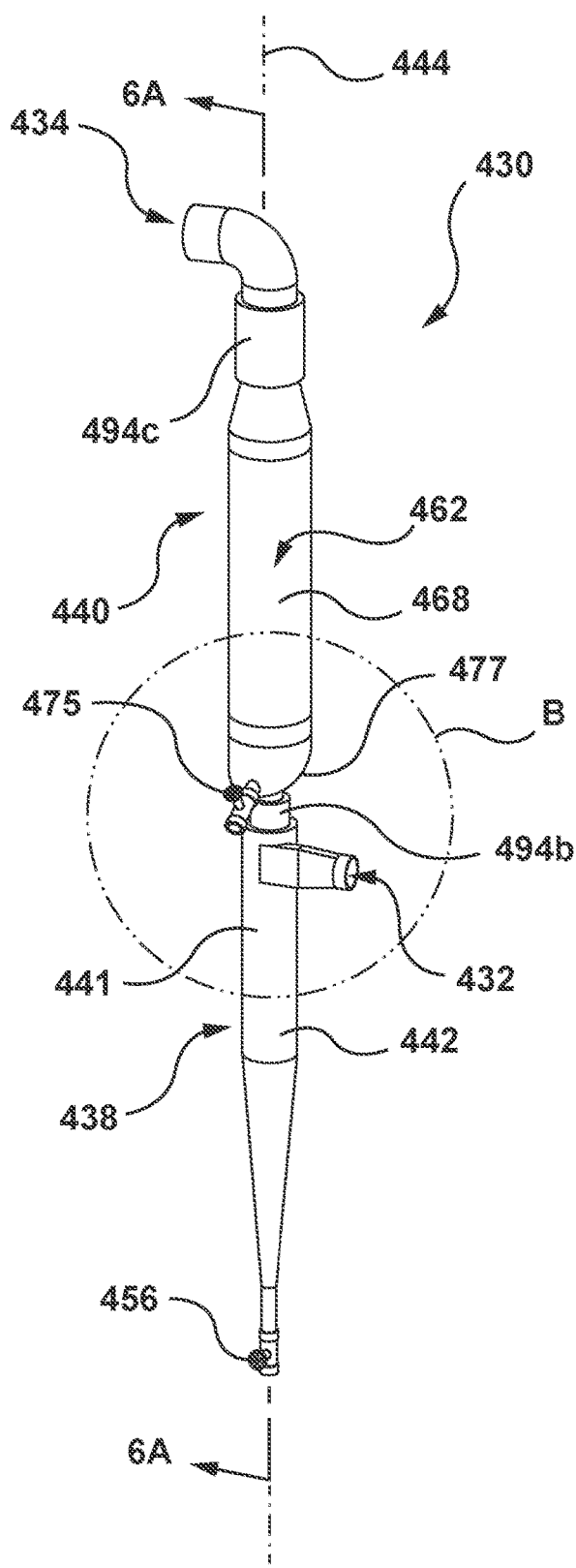
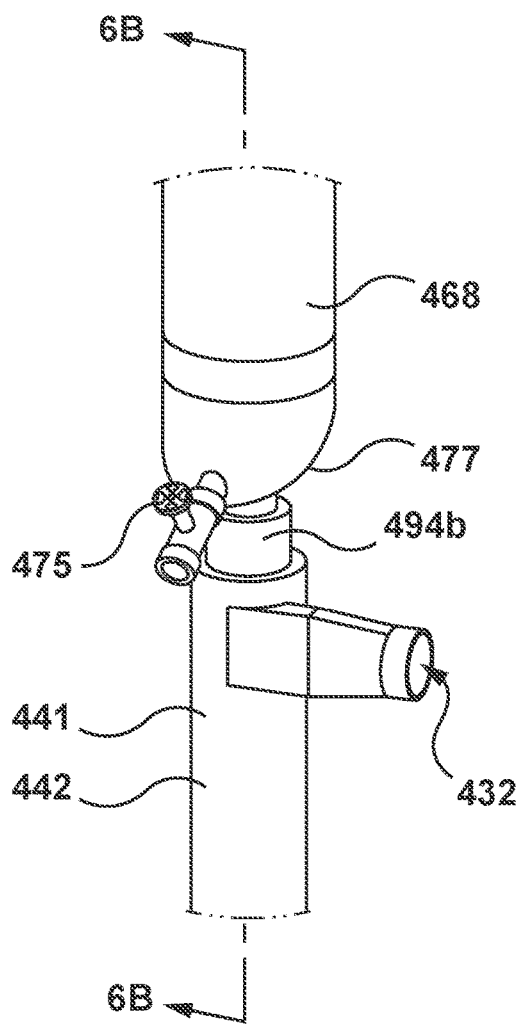
FIG. 5A
FIG. 5B

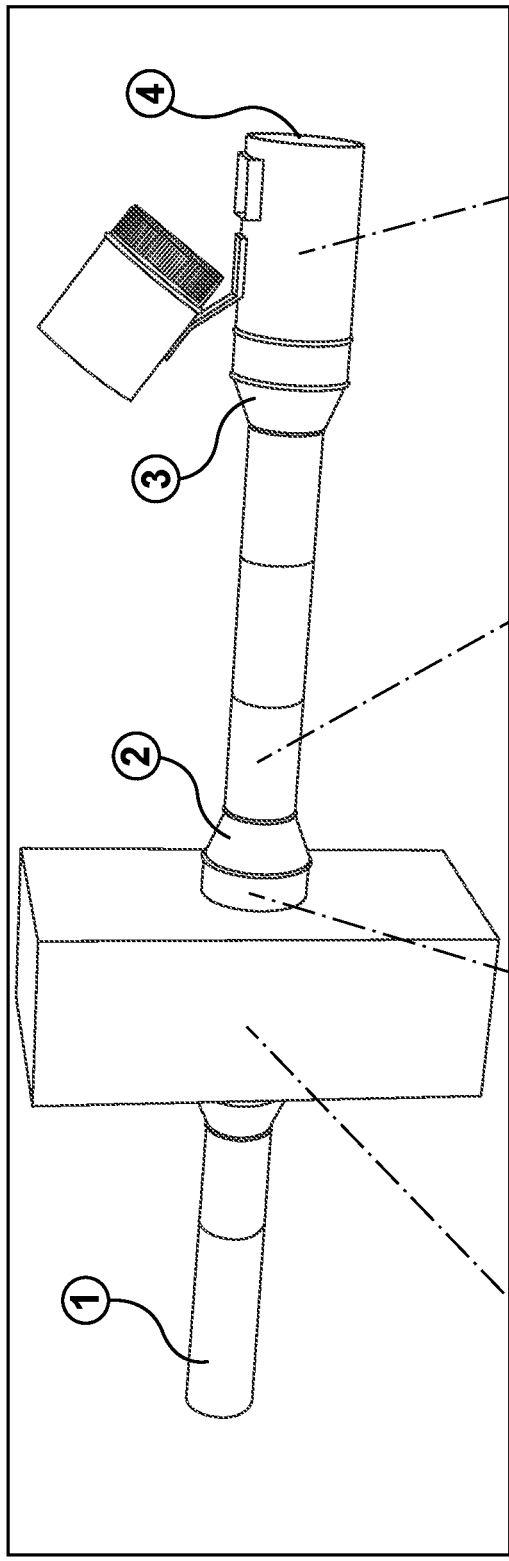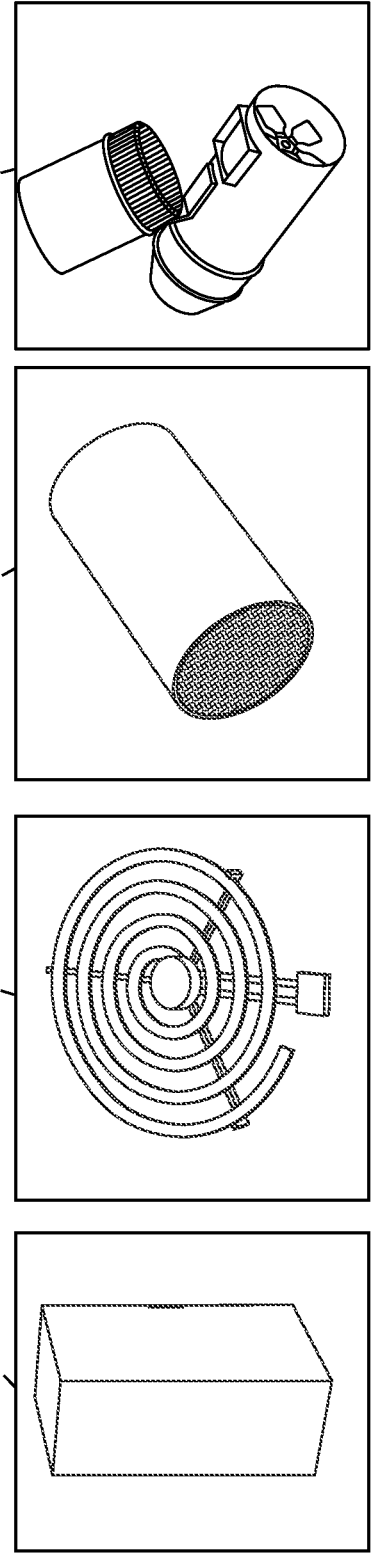
FIG. 8A FIG. 8B FIG. 8C FIG. 8D FIG. 8E

ELECTROCYCLONIC PARTICLE COLLECTOR

CROSS-REFERENCE TO RELATED APPLICATION

This application is a national stage application of International Application PCT/CA2016/050024, filed on Jan. 12, 2016, and claims the benefit of U.S. Provisional Patent Application 62/155,615, filed on May 1, 2015, which is incorporated herein by reference in its entirety.

FIELD

The disclosure relates to apparatuses and methods for removing particulate matter from a gas stream, such as a flue gas. Specifically, the disclosure relates to particle collectors for electrostatically and optionally cyclonically removing particulate matter from a gas stream, and to related methods for removing particulate matter from a gas stream.

BACKGROUND

PCT Publication No. WO2008/147233 purports to disclose a system of cyclones with electrostatically enhanced recirculation, comprising a collector cyclone and an entry for dirty gases, located upstream from a recirculator with a central channel for exhausting the cleaned gases. These cyclones are placed in series and have a recirculation line from the concentrator to the collector, to recirculate part of the gas stream. There are means in the recirculator for applying a high voltage, producing an ionizing electric field that drives the particles away from the central exhaust channel, without any significant particle deposition on the recirculator walls. The particles are driven away from the central exhaust channel in the recirculator by the joint action of mechanical and electrical forces. The particles are concentrated in the fraction of the gas stream that is recycled back to the collector cyclone, where a part is captured. The system is used for dedusting and dry gas cleaning, especially for acid gases, and for capturing bacteria.

SUMMARY

The following summary is intended to introduce the reader to various aspects of the disclosure, but not to define or delimit any invention.

According to one aspect, an electrocyclonic particle collector (EPC) for removing particulate matter from a gas is disclosed. The EPC comprises an EPC gas inlet, an EPC gas outlet, and an EPC gas flow path between the EPC gas inlet and the EPC gas outlet. A first section is downstream of the EPC gas inlet and comprises a first cyclonic particle collector in the EPC gas flow path for cyclonically removing particles from the gas. A second section is in series with the first section and comprises a rotational flow chamber in the EPC gas flow path, and at least a first electrode in the EPC gas flow path for facilitating electrostatic removal of particles from the gas stream in the rotational flow chamber.

The second section may further comprise an inlet conduit extending from the first cyclonic particle collector to the rotational flow chamber. The first electrode may be associated with the inlet conduit. The inlet conduit may comprise a conductive cylinder, and the conductive cylinder may form at least a part of the first electrode.

The inlet conduit and the rotational flow chamber may extend along a common longitudinal axis. The first cyclonic particle collector may extend along the longitudinal axis.

The EPC may further comprise a rotational flow director for facilitating rotational flow in the rotational flow chamber. The rotational flow director may be mounted to a downstream end of the inlet conduit and may be housed in the rotational flow chamber. The EPC may further comprise a grate mounted across the downstream end of the inlet conduit, and the rotational flow director may be mounted to the grate.

The rotational flow director may comprise a cone having a tapered end, a flared end, and a conic wall extending therebetween. The tapered end may be mounted to the grate. At least one helical wing may extend along the conic wall.

A second electrode may be in the gas flow path and electrically insulated from the first electrode. The rotational flow chamber may comprise a chamber wall, and the chamber wall may form the second electrode.

The EPC may further comprise at least one power source providing a negative charge to the first electrode and a positive charge to the second electrode.

The rotational flow chamber may comprise a chamber wall, and the inlet conduit may be electrically insulated from the chamber wall and from the first cyclonic particle collector.

The rotational flow chamber may comprise a chamber wall, and the chamber wall may form the first electrode At least a first portion of the inlet conduit may be within the first cyclonic particle collector. At least a second portion of the inlet conduit may be between the first cyclonic particle collector and the rotational flow chamber. At least a third portion of the inlet conduit may be within the rotational flow chamber.

The rotational flow chamber may be positioned above the first cyclonic particle collector.

The first cyclonic particle collector may have a first diameter, the rotational flow chamber may have a second diameter, and the second diameter may be greater than the first diameter.

According to another aspect, a method for removing particulate matter from a gas stream is disclosed. The method comprises a) cyclonically removing coarse particles from the gas stream to generate a cyclonically treated gas stream; b) applying an electrostatic charge to the cyclonically treated gas stream to generate a charged gas stream; and c) removing fine particles from the charged gas stream by applying an opposite electrostatic charge to the charged gas stream while rotationally flowing the charged gas stream.

Step a) may comprise flowing the gas stream through a first cyclonic particle collector.

Step b) may comprise flowing the cyclonically treated gas stream past a negatively charged electrode.

Step b) may comprise flowing the cyclonically treated gas stream through a conduit. The conduit may form at least a part of the negatively charged electrode.

Step c) may comprise rotationally flowing the charged gas stream past a positively charged electrode. Step c) may comprise flowing the charged gas stream through a rotational flow chamber concurrently with flowing the charged gas stream past the positively charged electrode.

Step a) may comprise flowing the gas stream at a first average speed to cyclonically remove the coarse particles, and step c) may comprise flowing the gas stream at a second average speed less than the first speed.

According to another aspect, a flue gas treatment apparatus for treating a carbon dioxide rich flue gas is disclosed. The flue gas treatment apparatus comprises a flue gas inlet, a treated gas outlet downstream of the flue gas inlet, and a gas flow path therebetween. An electrocyclonic particle collector (EPC) is in the gas flow path and comprises an EPC gas inlet, an EPC gas outlet, and an EPC gas flow path therebetween. A first section is downstream of the EPC gas inlet and comprises a first cyclonic particle collector in the EPC gas flow path for cyclonically removing particles from the gas. A second section is in series with the first section and comprises a rotational flow chamber in the EPC gas flow path, and at least a first electrode in the EPC gas flow path for facilitating electrostatic removal of particles from the gas stream in the rotational flow chamber. At least a first catalytic converter is in the gas flow path downstream of the EPC for eliminating at least some toxic contaminant gases from the flue gas. At least a first fan is provided for forcing the flue gas from the flue gas inlet to the treated gas outlet.

The second section may further comprise an inlet conduit extending from the first cyclonic particle collector to the rotational flow chamber. The first electrode may be associated with the inlet conduit. The inlet conduit may comprise a conductive cylinder and the conductive cylinder may form at least a part of the first electrode.

The inlet conduit and the rotational flow chamber may extend along a common longitudinal axis. The first cyclonic particle collector may extend along the longitudinal axis.

The flue gas treatment apparatus may further comprise a rotational flow director for inducing rotational flow in the rotational flow chamber. The rotational flow director may be mounted to a downstream end of the inlet conduit and may be housed in the rotational flow chamber. A grate may be mounted across the downstream end of the inlet conduit, and the rotational flow director may be mounted to the grate.

The rotational flow director may comprise a cone having a tapered end, a flared end, and a conic wall extending therebetween. The tapered end may be mounted to the grate. At least one helical wing may extend along the conic wall.

The flue gas treatment apparatus may further comprise a second electrode in the gas flow path and electrically insulated from the first electrode. The rotational flow chamber may comprise a chamber wall, and the chamber wall may form the second electrode.

The flue gas treatment apparatus may further comprise at least one power source providing a negative charge to the first electrode and a positive charge to the second electrode.

The rotational flow chamber may comprise a chamber wall, and the inlet conduit may be electrically insulated from the chamber wall and from the first cyclonic particle collector.

The rotational flow chamber may comprise a chamber wall, and the chamber wall may form the first electrode.

At least a first portion of the first electrode may be within the first cyclonic particle collector. At least a second portion of the first electrode may be between the first cyclonic particle collector and the rotational flow chamber. At least a third portion of the first electrode may be within the rotational flow chamber.

The rotational flow chamber may be positioned above the first cyclonic particle collector.

The first cyclonic particle collector may have a first diameter, the rotational flow chamber may have a second diameter, and the second diameter may be greater than the first diameter.

According to another aspect, a particle collector for removing particulate matter from a gas stream is disclosed.

The particle collector comprises an inlet conduit having an upstream end and a downstream end. A rotational flow chamber includes a chamber wall and extends along a longitudinal axis and defines a chamber volume. The chamber volume has an inlet end in communication with the downstream end of the inlet conduit, and an opposed outlet end spaced from the inlet end along the longitudinal axis and in communication with a gas outlet. A rotational flow director is in at least one of the inlet conduit and the inlet end for inducing rotational flow in the gas stream entering the inlet end. At least a first electrode is provided for facilitating electrostatic removal of particles from the gas stream in the rotational flow chamber.

The first electrode may be associated with at least one of the inlet conduit and the chamber wall.

At least the downstream end of the inlet conduit may extend along the longitudinal axis.

The rotational flow director may be housed in the inlet end. The rotational flow director may be mounted to the inlet conduit.

The first electrode may be associated with the inlet conduit. The inlet conduit may comprise a conductive cylinder and the conductive cylinder may form at least a part of the first electrode. The inlet conduit may be electrically insulated from the chamber wall.

The particle collector may further comprise a second electrode associated with the chamber wall. The chamber wall may be conductive and may form the second electrode.

The first electrode may be associated with the chamber wall. The chamber wall may be conductive and may form the first electrode.

The particle collector may further comprise a cyclonic particle collector upstream of the inlet conduit in communication with the inlet conduit.

According to another aspect, an electrocyclonic particle collector (EPC) for removing particulate matter from a gas is disclosed. The EPC comprises an EPC gas inlet, an EPC gas outlet, and an EPC gas flow path between the EPC gas inlet and the EPC gas outlet. A first section is downstream of the EPC gas inlet and comprises a first cyclonic particle collector in the gas flow path for cyclonically removing particles from the gas. A second section is in series with the first section and comprises an inlet conduit having an upstream end in communication with the first cyclonic particle collector, and a downstream end. A first electrode is associated with the inlet conduit. A rotational flow chamber is defined by a chamber wall and extends along a longitudinal axis and defines a chamber volume. The chamber volume has an inlet end in communication with the downstream end of the conduit, and an opposed outlet end spaced from the inlet end along the longitudinal axis and in communication with a gas outlet. A second electrode is associated with the chamber wall and is electrically insulated from the first electrode. A rotational flow director is in at least one of the inlet conduit and the inlet end for inducing rotational flow in the gas stream entering the inlet end.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 5A is a perspective view of the particle collector of FIG. 4;

FIG. 5B is an enlarged view of the region shown in circle B in FIG. 5A;

FIG. 8A is a perspective view of a prototype apparatus for carbon dioxide enrichment;

FIG. 8B is a perspective view of the filter of the prototype of FIG. 8A;

FIG. 8C is a perspective view of the heater of the prototype of FIG. 8A;

FIG. 8D is a perspective view of the catalytic converter of the prototype of FIG. 8A;

FIG. 8E is a perspective view of the suction fan of the prototype of FIG. 8A;

DETAILED DESCRIPTION

Figure 1:
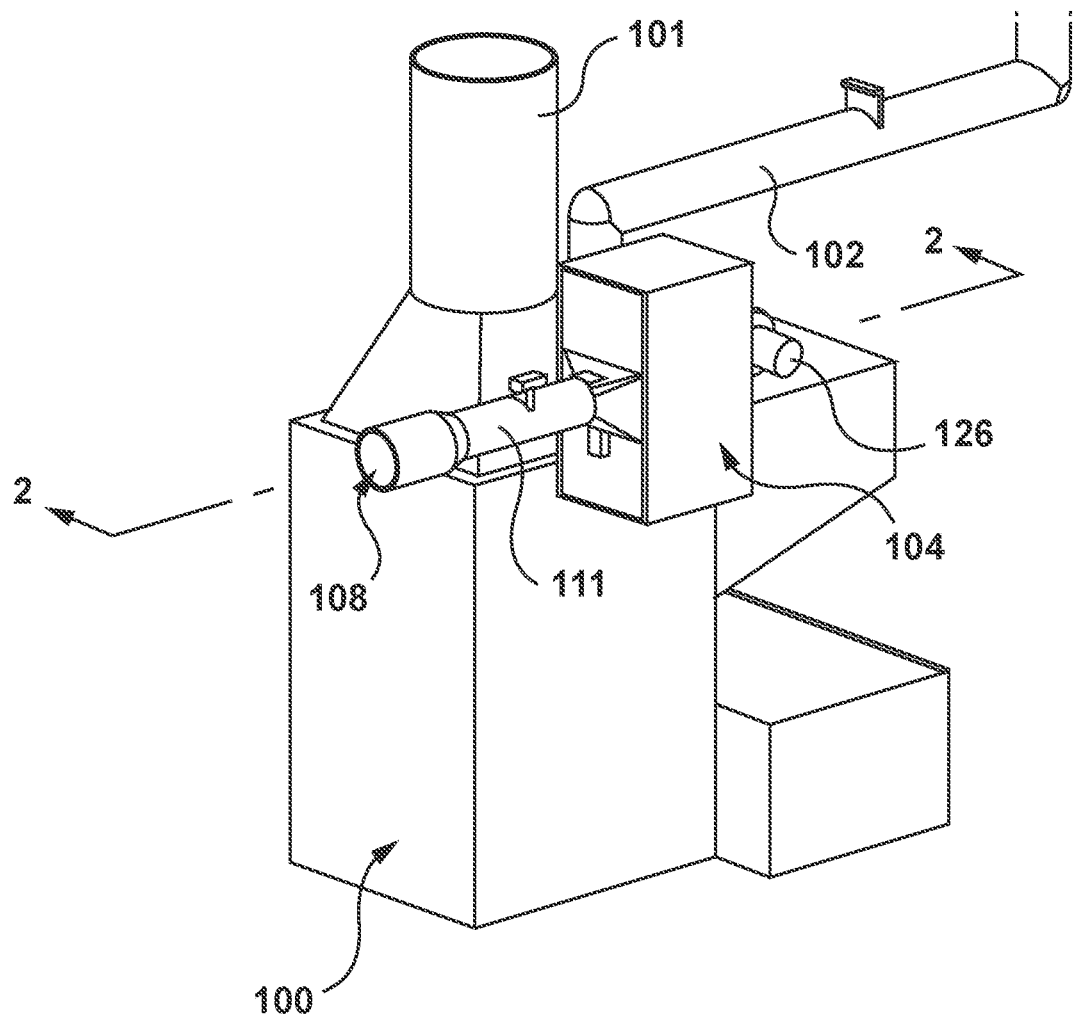
FIG. 1 is a perspective view of an example apparatus for carbon dioxide enrichment.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Carbon dioxide enrichment is a technique whereby carbon dioxide is supplied to a greenhouse to enhance photosynthesis and improve the growth of greenhouse plants. Carbon dioxide enrichment may be practiced by combusting hydrocarbon fuels, such as natural gas, to provide a source of carbon dioxide.

Biomass combustion furnaces are known to be used for greenhouse heating. Combustion of biomass in these biomass furnaces provides a potential source of carbon dioxide for carbon dioxide enrichment. However, biomass combustion is not as clean as natural gas combustion, and yields flue gases that are high in contaminants such as, but not limited to, nitrogen oxides (NOx), sulfur oxides (SOx), carbon monoxide (CO), volatile organic compounds (VOCs), as well as particulates such as soot, char, and/or tar, all of which can be toxic to plants. Due to the presence of these toxic contaminants, flue gases from biomass furnaces are not typically used for carbon dioxide enrichment.

Described herein is an apparatus and method for carbon dioxide enrichment. The method may involve combusting biomass to produce a carbon dioxide rich flue gas (also referred to herein as a "gas stream"), and treating the flue gas to eliminate at least some toxic contaminants therefrom, to thereby provide a carbon dioxide stream that may be used for carbon dioxide enrichment. As set out in the Examples section below, it has been determined that the flue gas treatment apparatuses as described herein may significantly reduce the amount of toxic contaminants such CO, sulfur dioxide ($SO_2$), NOx, and VOCs in the flue gas from a biomass combustion furnace, to yield a carbon dioxide rich gas stream that is suitable for carbon dioxide enrichment in a greenhouse. For example, the flue gas treatment apparatuses disclosed herein may reduce the amount of CO in the flue gas from 1100 ppm to less than 1 ppm, may reduce the amount of nitric oxide (NO) in the flue gas from 70 ppm to 10 ppm, may reduce the amount of $SO_2$ in the flue gas from 19 ppm to less than 1 ppm, and may leave no visual trace of particulates in the flue gas. Furthermore, the heat generated by the combustion furnace may be used to heat the greenhouse.

Further described herein is an apparatus and method for removing particulate matter from a gas stream. The method may involve applying an electrostatic charge to the gas stream while rotationally flowing the gas stream. The apparatus/methods may be used in the flue gas treatment apparatus/methods described in the above paragraph, or in other apparatuses/methods, or as a standalone apparatus/method.

Referring now to FIG. 1, an example combustion furnace 100 is shown. The combustion furnace may be any suitable combustion furnace in which a hydrocarbon fuel may be combusted to generate a carbon dioxide rich flue gas. For example, the combustion furnace may be a biomass combustion furnace such as a wood pellet combustion furnace. The combustion furnace may optionally include a hot air duct 101 for supplying hot air to a nearby structure, such as the greenhouse to which the carbon dioxide may ultimately be supplied. For example, air may be blown past a heat exchanger in the furnace and to the greenhouse via the hot air duct 101. The combustion furnace 100 further includes a flue gas outlet 102, through which flue gases exit the furnace.

Referring still to FIG. 1, a flue gas treatment apparatus 104 is connected to the flue gas outlet 102 of the combustion furnace 100. The flue gas treatment apparatus 104 is for treating the carbon dioxide rich flue gas to eliminate at least some contaminants therefrom and generate a treated carbon dioxide rich gas stream. In the example shown, the flue gas treatment apparatus 104 is connected to the flue gas outlet 102 of the combustion furnace 100 such that a portion of the flue gas exiting the flue gas outlet 102 passes into the flue gas treatment apparatus 104. For example, a tee-fitting (not shown) may be installed on the flue gas outlet 102 to divert a portion of the flue gas to the flue gas treatment apparatus 104. In alternative examples, the flue gas treatment apparatus 104 may be connected to the flue gas outlet 102 of the combustion furnace 100 such that all of the flue gas exiting the flue gas outlet 102 passes into the flue gas treatment apparatus 104.

The flue gas treatment apparatus 104 may generally include a particulate removal device for eliminating at least some particulate matter from the flue gas, at least a first catalytic converter downstream of the particulate removal device for eliminating at least some toxic contaminant gases from the flue gas, and at least a first fan for forcing the flue gas through the flue gas treatment apparatus 104.

Figure 2:
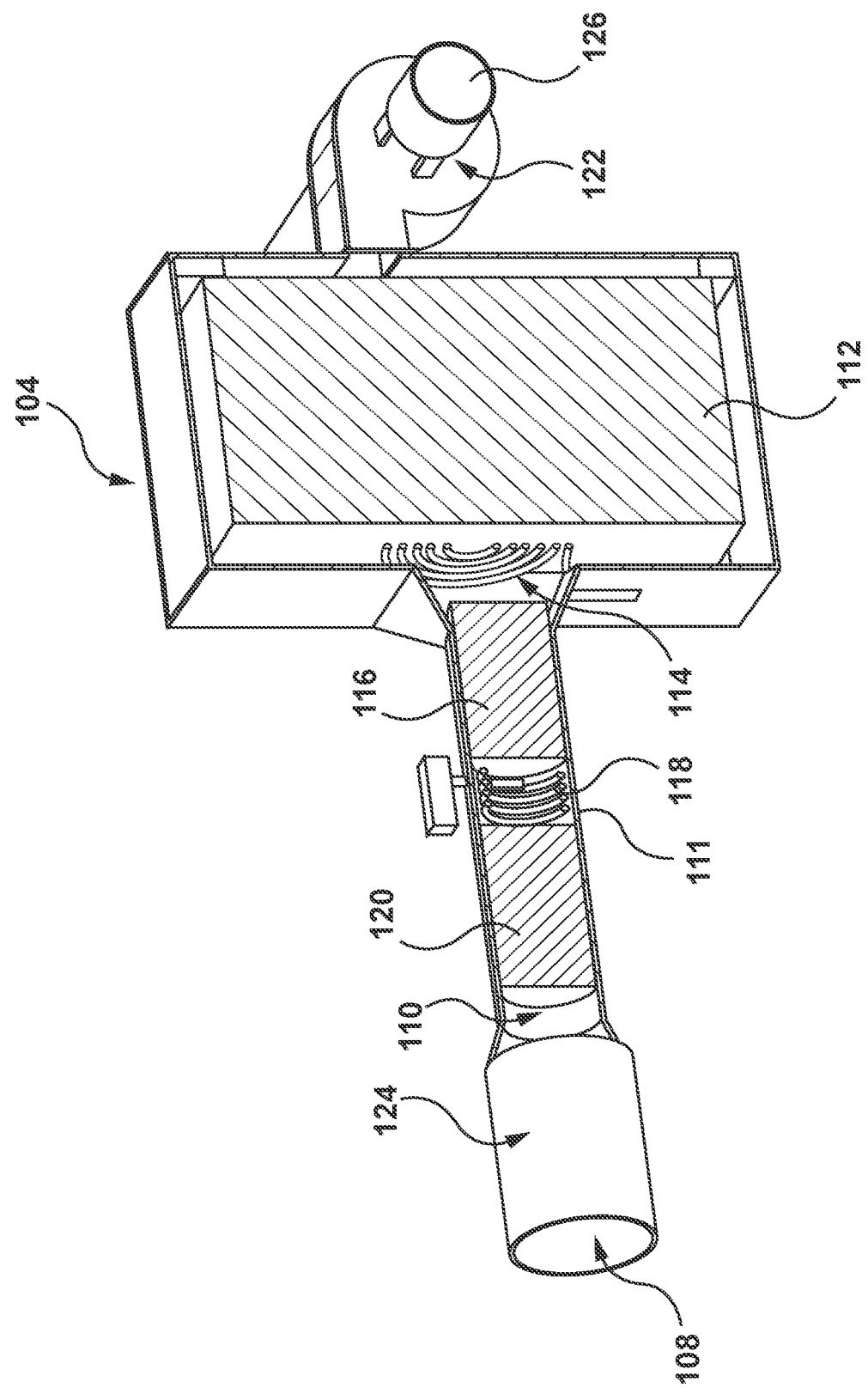
FIG. 2 is a cross section taken along line 2-2 in FIG. 1.

Referring to FIGS. 1 and 2, in the example shown, the flue gas treatment apparatus 104 includes a flue gas inlet 106 (shown in FIG. 3) in communication with the flue gas outlet 102 of the combustion furnace 100, a treated gas outlet 108 downstream of the flue gas inlet 106, and a gas flow path 110 therebetween. The gas flow path 110 may be defined by a frame 111. In the example shown, the frame 111 is a galvanized steel frame sealed with metallic sealing tape.

Referring still to FIG. 2, in the example shown, a particulate removal device 112 (also referred to as a particulate emission reduction device) is positioned in the gas flow path. The flue gas may be passed through the particulate removal device 112 for eliminating at least some particulate matter from the flue gas. The particulate removal device may include, for example, a filter. In one particular example, the filter is a rigid box filter including a fiberglass filter pad. It has been determined that such filters can withstand the high temperatures of the flue gas leaving the combustion furnace. Such temperatures can in some examples be about 215 degrees Celsius. Some such fiberglass filter pads may trap particulates having a diameter of as low as 0.3 microns, and may have an efficiency of 95%. In other examples, other types of filters may be used, such as a bag filter, a HEPA filter, or an ionic air filter.

In alternative examples, the particulate removal device may include, but is not limited to, a settling chamber, a cyclone, an electrostatic precipitator, or a scrubber. In further alternative examples, the particulate removal device may additionally or alternatively include a particle collector as described below with reference to FIGS. 4 to 7.

Referring still to FIG. 2, in the example shown, a first heater 114 and a first catalytic converter 116 are positioned in the gas flow path. The first heater 114 is downstream of the particulate removal device 112, and the first catalytic converter 116 is downstream of the first heater 114. The flue gas may be passed through the first catalytic converter 116 to eliminate at least some toxic contaminant gases from the flue gas, and the first heater 114 may heat the flue gas to a first treatment temperature, to enhance the efficiency of the first catalytic converter 116.

The first catalytic converter 116 may be any suitable catalytic converter that eliminates at least some toxic contaminants from the flue gas. In one example, the first catalytic converter 116 eliminates at least some CO and $SO_2$ from the flue gas, by converting the CO and $SO_2$ to less harmful gases, such as carbon dioxide and sulfur trioxide ($SO_3$). The $SO_3$ combines with humidity (water) to form $H_2SO_4$ in the air, and can easily be removed from the air. In one example, the first catalytic converter 116 is a universal type palladium-based catalytic converter. For example, the first catalytic converter 116 may be a universal catalytic converter containing a loading of 318 micrograms/$cm^3$ of palladium (and no rhodium or platinum) sold by Catalyseur National (St. Hubert, Quebec, Canada). In alternative examples, other types of catalytic converters may be used.

It has been determined that temperatures above approximately 250 degrees Celsius in the first heater may lead to thermally catalyzed production of NOx in the flue gas. Accordingly, in some examples, the first treatment temperature may be selected to enhance the removal of carbon monoxide and sulfur dioxide from the flue gas in the first catalytic converter 116, while minimizing the production of NOx by the first heater 114. For example, the first treatment temperature may be at most about 250 degrees Celsius. In some examples, the first treatment temperature may be between about 200 degrees Celsius and 250 degrees Celsius. In some examples, the first treatment temperature may be between about 225 Celsius and 235 degrees Celsius. In one particular example, the first heater 114 may be set to about 230 degrees Celsius. It has been determined that the above temperatures allow for elimination of a significant portion of CO and $SO_2$ from the flue gas, while preventing, minimizing, or limiting thermally catalyzed production of NOx.

In some examples, the first heater 114 may be an electric heating element.

Referring still to FIG. 2, in the example shown, a second heater 118 and a second catalytic converter 120 are positioned in the gas flow path. The second heater 118 is downstream of the first catalytic converter 116, and the second catalytic converter 120 is downstream of the second heater 118. The flue gas may be passed through the second catalytic converter 120 to eliminate at least some additional toxic contaminant gases from the flue gas, and the second heater 118 may heat the flue gas to a second treatment temperature, to enhance the efficiency of the second catalytic converter 120.

The second catalytic converter 120 may be any suitable catalytic converter that eliminates at least some toxic contaminant gases from the flue gas. In one example, the second catalytic converter 120 eliminates at least some NOx from the flue gas, by converting the NOx to less harmful gases such as $N_2$. In some particular examples, the second catalytic converter 120 may be a California CARB Compliant Universal Catalytic Converter sold by Magnaflow (California, USA).

In some examples, the second treatment temperature may be selected to enhance the removal of NOx from the flue gas in the second catalytic converter 120. For example, the second treatment temperature may be higher than the first treatment temperature. In some examples, the second treatment temperature may be between about 300 degrees Celsius and 370 degrees Celsius. In some examples, the second treatment temperature may be between about 345 degrees Celsius and 355 degrees Celsius. In one particular example, the second heater 118 may be set to about 350 degrees Celsius. Although some NOx may be thermally produced in the second heater when operating at this temperature about 350 degrees Celsius, it has been determined that this excess NOx is largely eliminated by the second catalytic converter 120.

In some examples, the second heater 118 may be an electric heating element.

In alternative examples, the first heater 114 and/or the second heater 118 may be omitted, and the first and/or second catalytic converters 116, 120 may be operated at the ambient temperature of the flue gas. In further alternative examples, the flue gas treatment apparatus may include only a single catalytic converter, as shown in the Examples section below.

Referring to FIG. 2, at least a first fan may be provided for forcing the flue gas from the flue gas inlet to the treated gas outlet. In the example shown, a first fan 122 and a second fan 124 are provided. The first fan 122 is positioned upstream of the particulate removal device 112, and the second fan 124 is positioned downstream of the second catalytic converter 120.

Figure 3:
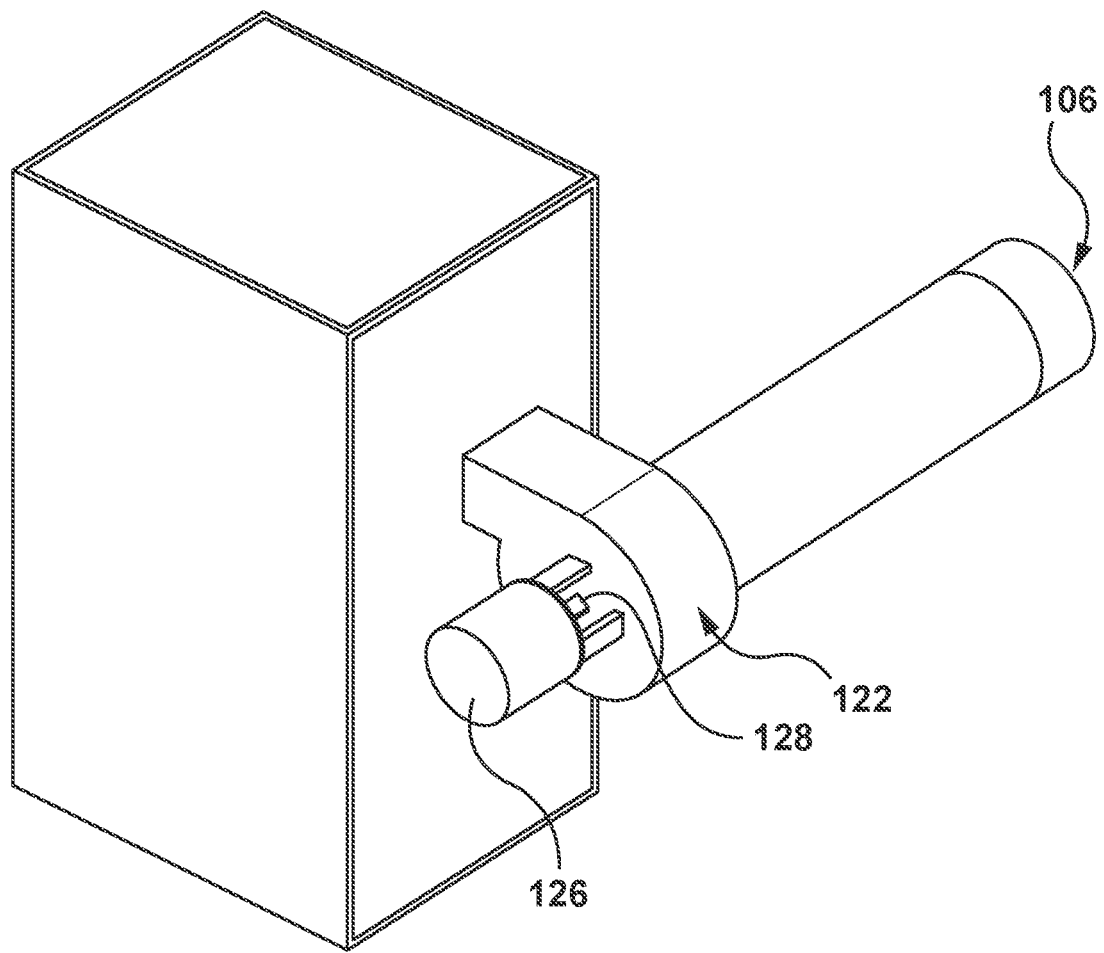
FIG. 3 is an enlarged perspective view of the first fan of FIG. 1.

Referring still to FIG. 2, in the example shown, the second fan 124 is an in-line duct fan, and may also be referred to as a suction fan. In the example shown, the first fan 122 is a centrifugal fan, and includes an impeller (not shown) mounted in the frame 111 and positioned in the gas flow path 110, and a motor 126 driving the impeller. In order to protect the motor 126 from the heat of the flue gas and reduce the risk of the motor 126 overheating, the motor 126 is positioned exterior of the frame 111, and spaced from the gas flow path 110. Referring also to FIG. 3, a shaft 128 extends through the frame 111 between the motor 126 and the impeller for connecting the motor 126 to the impeller. In some examples, a supplementary fan may be provided in order to provide additional cooling to the motor.

Referring to FIG. 2, the treated gas outlet 108 is downstream of the second fan 124. The treated carbon dioxide rich gas stream leaving the treated gas outlet 108 may be fed to a greenhouse, for the purpose of carbon dioxide enrichment.

The flue gas treatment apparatus 104 may be provided together with the combustion furnace 100, or may be provided as a separate unit that can be connected in fluid communication with a flue gas outlet of the combustion furnace 100. For example, the flue gas treatment apparatus 104 may be retrofitted to pre-existing combustion furnaces.

The examples described above relate to the combustion of biomass, and particularly wood pellets, in a biomass combustion furnace. In alternative examples, other types of biomass may be combusted, such as but not limited to products, by-products, residues, and waste from agriculture and forestry industries, and industrial and municipal wastes. Furthermore, the biomass may be provided in its raw form, or in a processed form such as pellets, chips, or brickettes. In further alternative examples, types of fuel other than biomass fuel may be combusted, and other types of furnaces may be used.

It has been determined that it is advantageous to provide the particulate removal device upstream of the catalytic converters, because particulates may foul the catalytic converters. However, in alternative examples, the particulate removal device may be provided downstream of the catalytic converters.

Figure 4:
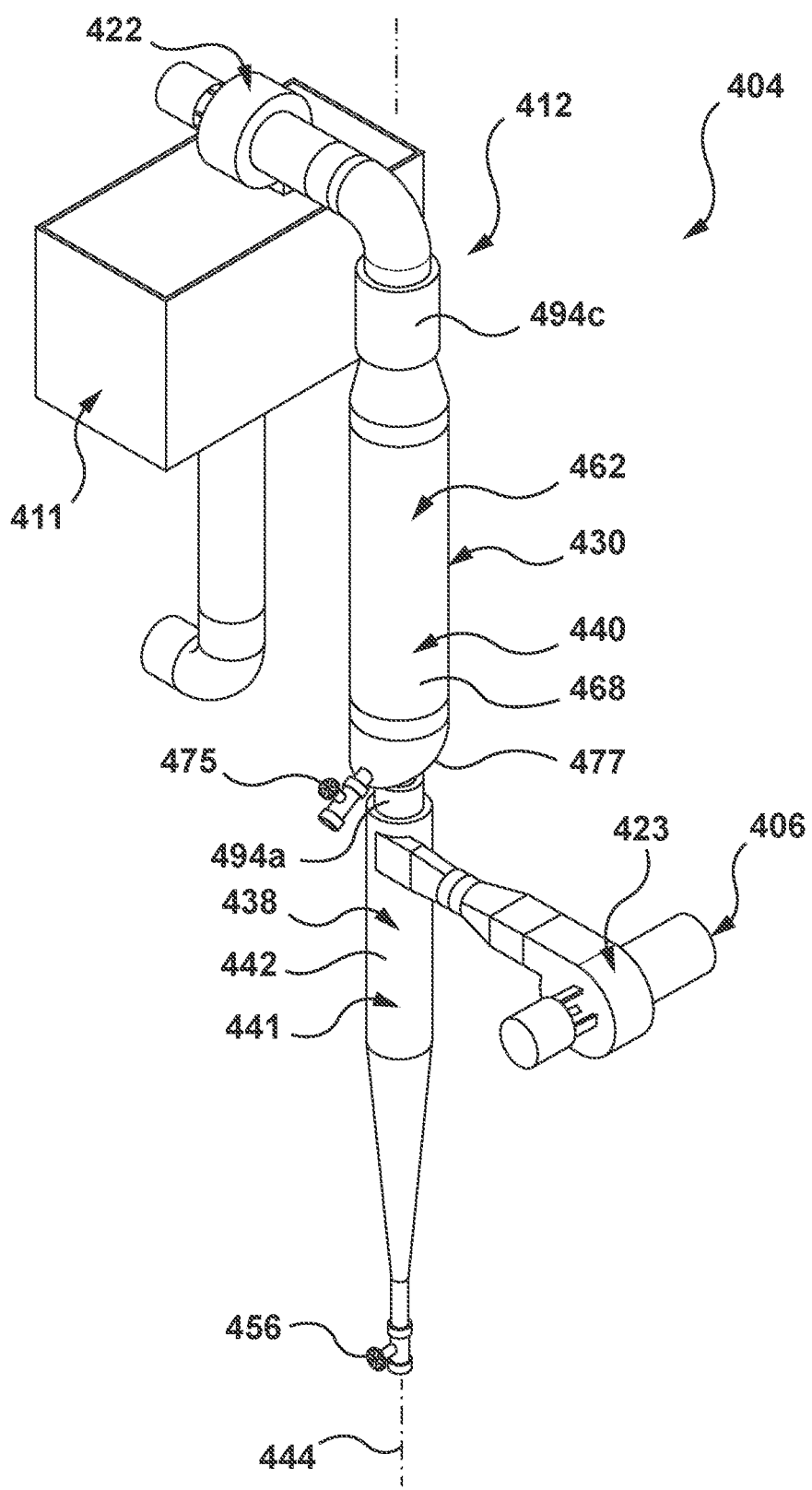
FIG. 4 is a perspective view of an alternative example apparatus for carbon dioxide enrichment, including a particle collector.

Referring now to FIG. 4, an alternative example flue gas treatment apparatus 404 is shown. In FIGS. 4 to 6, like features to FIGS. 1 to 3 will be referred to with like reference numerals, incremented by 300.

The flue gas treatment apparatus 404 is similar to the flue gas treatment apparatus 104, and includes a particulate removal device 412, a first heater, a first catalytic converter, a second heater, and a second catalytic converter, and a frame 411; however, the particulate removal device 412 includes a particle collector 430 in addition to a filter. The particle collector 430 may in some examples also be referred to as an electrocyclonic particle collector (EPC) 430.

The EPC 430 is downstream of the flue gas inlet 406, in the gas flow path of the flue gas treatment apparatus 404. In the example shown, the EPC 430 is positioned upstream of a filter, which is housed in a frame 411 and is similar to the filter of FIGS. 1 to 3. In such examples, the EPC 430 may prolong the service life of the filter, by removing particulate matter that might otherwise foul the filter. However, in alternative examples, the EPC 430 may be provided instead of a filter, downstream of a filter, or in combination with another particulate removal device.

Referring still to FIG. 4, in the example shown, the flue gas treatment apparatus 404 includes a first fan 422 corresponding to the first fan 122 of FIGS. 1 to 3, as well as an additional fan 423 upstream of the EPC 430, for blowing flue gas into the EPC 430.

Referring now to FIGS. 5A-6B, the EPC 430 will be described in further detail. The EPC 430 includes an EPC gas inlet 432, an EPC gas outlet 434, and an EPC gas flow path 436 between the EPC gas inlet 432 and the EPC gas outlet 434.

In the example shown, the EPC 430 includes two sections, namely a first section 438 and a second section 440 in series with the first section 438. In some examples, coarse particles (e.g. particles having an average diameter of greater than about 2.5 microns) may be cyclonically removed from the flue gas in the first section 438, and fine particles (e.g. particles having an average diameter of less than about 2.5 microns) may be removed from the flue gas in the second section 440 by applying an electrostatic charge to the flue gas while rotationally flowing the flue gas, as will be described in further detail below. The terms "coarse particles" and "fine particles" are used herein as relative terms, and are not intended to be limited to any particular size, unless otherwise indicated. It is believed that overall removal of particulate matter is enhanced by removing coarse particles from the flue gas in the first section 438 prior to removing fine particles in the second section 440, since the coarse particles are then generally absent (or present in lowered amounts) in the second section 440, and therefore generally cannot knock into the fine particles in the second section 440 and cause them to become re-entrained in the flue gas. However, in alternative examples, as will be described hereinbelow, the particle collector may include only the second section 440.

Figure 6A:
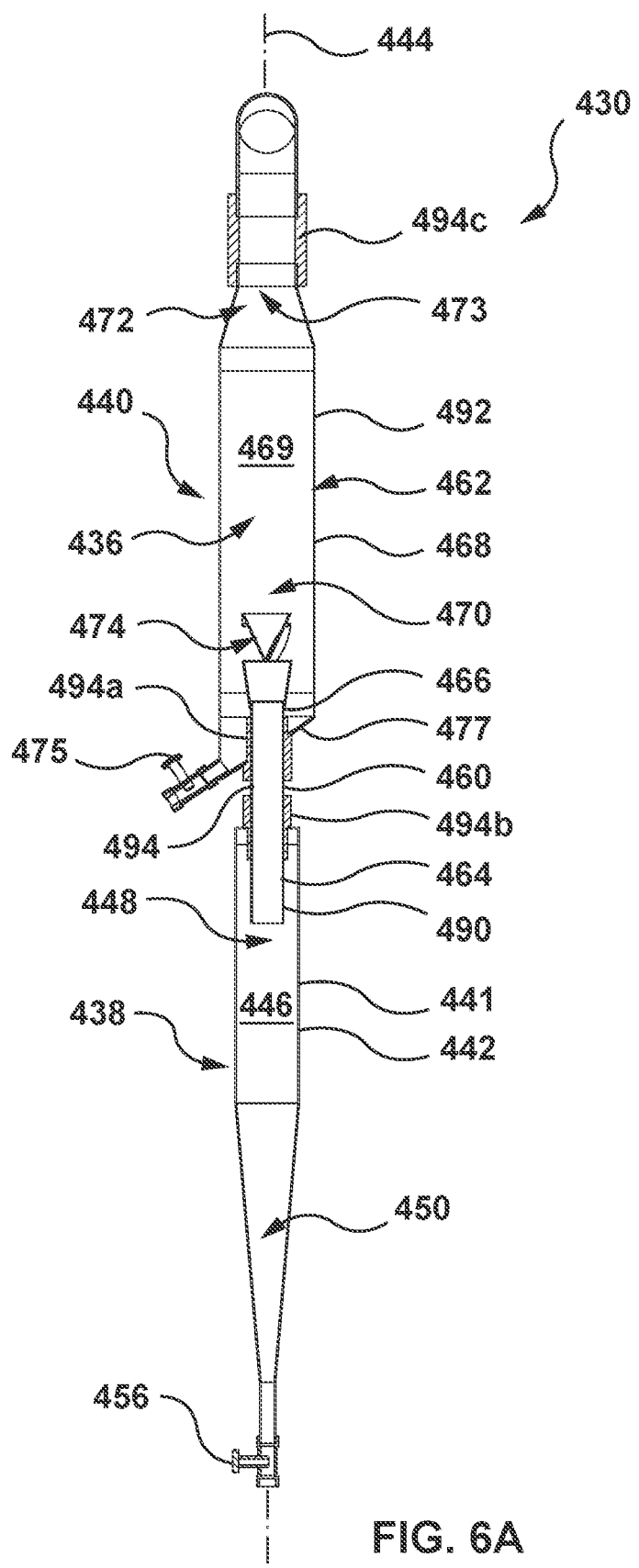
FIG. 6A is a cross sectional view taken along line 6A-6A in FIG. 5A.

Referring to FIGS. 5A and 6A, the first section 438 includes a first cyclonic particle collector 441 (also referred to as a cyclonic separator 441) in the gas flow path 436 for cyclonically removing or separating particles from the gas stream. The first cyclonic particle collector 441 may be of various designs. In the example shown, the first cyclonic particle collector 441 includes a cyclone wall 442 extending along a generally vertical longitudinal axis 444, and defining a cyclone interior volume 446. The cyclone interior volume 446 includes a cyclone volume upper portion 448 and a cyclone volume lower portion 450. The first cyclonic particle collector 441 further includes a cyclone gas inlet in communication with the EPC gas inlet 432.

The first cyclonic particle collector 441 has a first diameter 443. The first diameter 443 may be, for example, between about 2 inches and about 6 inches. In some examples, the first diameter may be between about 3 inches and about 5 inches. In one particular example, the first diameter 443 may be about 4 inches.

Cyclonic separation in general is known in the art, and will not be described in detail herein. Briefly, in use, flue gas enters the cyclone interior volume 446 via the cyclone gas inlet, and flows therein. Particulate matter is cyclonically separated from the flue gas and drops into the cyclone volume lower portion 450. The flue gas then exits the first cyclonic particle collector 441 via a conduit 460, described in further detail below.

The first cyclonic particle collector 441 further includes a valve 456, which may be actuated to open the cyclone volume lower portion 450, and empty particulate matter that has collected in the cyclone volume lower portion 450.

The second section 440 is in series with and downstream of the first section 438, and gas exiting the first cyclonic particle collector 441 passes into the second section 440. In the second section, particles are electrostatically removed from the flue gas, as will be described in further detail below.

Figure 6B:
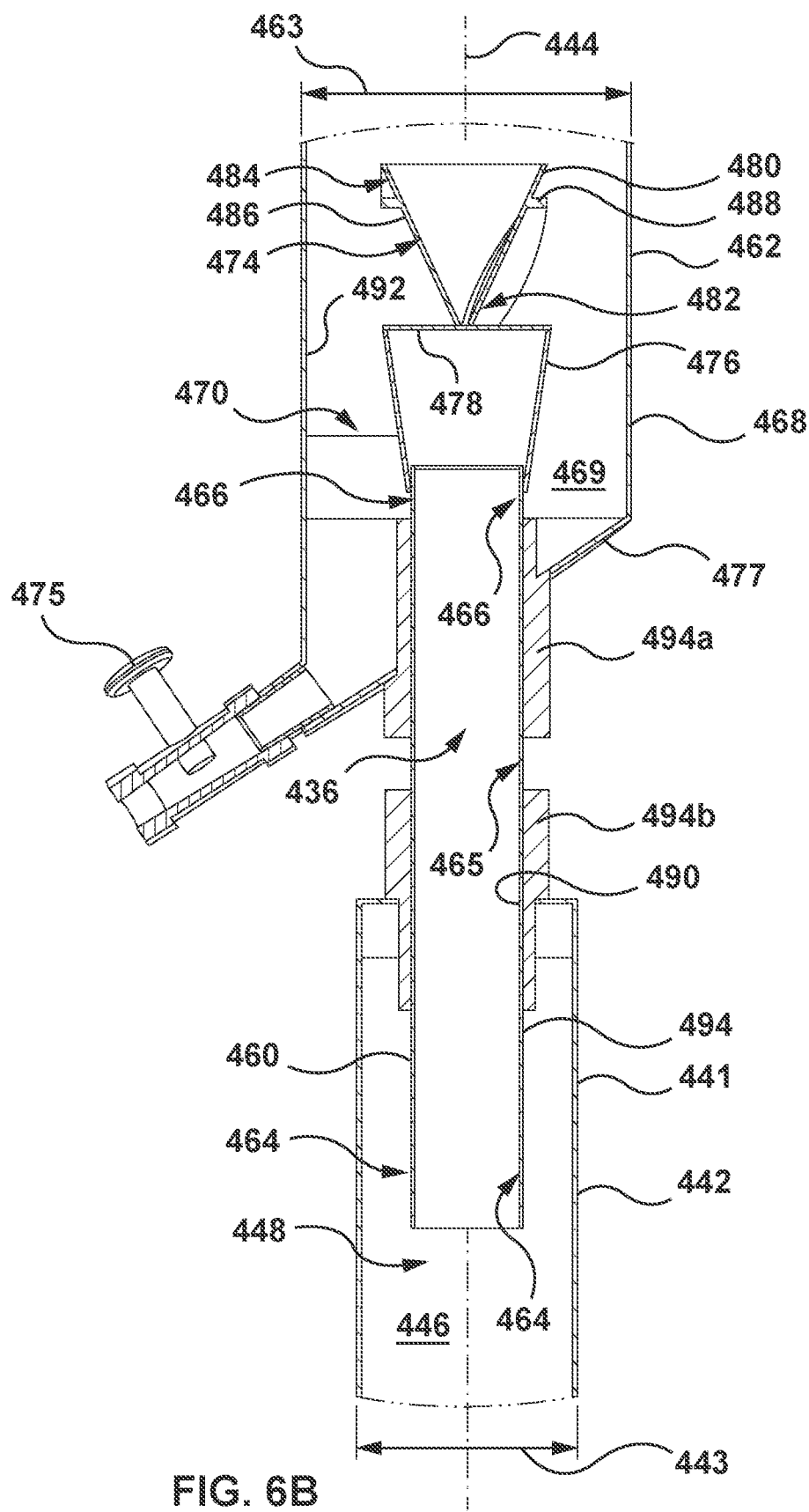
FIG. 6B is a cross section taken along line 6B-6B in FIG. 5B.

Referring to FIG. 6B, the second section 440 includes an inlet conduit 460, and a rotational flow chamber 462. The inlet conduit 460 includes an upstream end 464 in communication with the first cyclonic particle collector 441, and a downstream end 466 in communication with the rotational flow chamber 462. More specifically, the upstream end 464 (also referred to as a first portion of the inlet conduit 460) is within and in communication with the first cyclonic particle collector 441, a second portion 465 is between the first cyclonic particle collector 441 and the rotational flow chamber 462, and the downstream end 466 (also referred to as a third portion of the inlet conduit 460) is within and in communication with the rotational flow chamber 462.

In some examples, at least the downstream end 466 of the inlet conduit 460 may extend along the longitudinal axis 444. In the example shown, the inlet conduit 460 is generally linear and the entirety of the inlet conduit 460 extends along the longitudinal axis 444.

Referring to FIGS. 5A to 6B, the rotational flow chamber 462 includes a chamber wall 468, which is circular in transverse section, and which defines a rotational flow chamber interior volume 469 (also referred to herein as "interior volume 469"). The interior volume 469 has an inlet end 470, and an outlet end 472. The inlet end 470 is in communication with the downstream end 466 of the inlet conduit 460, and the outlet end 472 is in communication with a gas outlet 473. In the example shown, the chamber wall 468 extends along the longitudinal axis 444, and the first cyclonic particle collector 441, inlet conduit 460, and rotational flow chamber 462 are generally collinear, with the inlet conduit 460 positioned above the first cyclonic particle collector 441, and the rotational flow chamber 462 positioned above the inlet conduit 460. The outlet end 472 of the rotational flow chamber 462 is spaced from the inlet end 470 along the longitudinal axis 444.

The rotational flow chamber 462 has a second diameter 463. In some examples, the second diameter 463 may be between about 4 inches and about 8 inches. In some examples, the second diameter may be between about 5 inches and about 7 inches. In one particular example, the second diameter may be about 6 inches.

In the example shown, the second diameter 463 is greater than the first diameter 443 (i.e. the diameter of the first cyclonic particle collector 441). For example, the second diameter 463 may be about 6 inches and the first diameter may be about 4 inches.

The chamber wall 468 includes a bottom plate 477 that is sloped towards a valve 475. As will be described in further detail below, the valve 475 may be actuated to open the rotational flow chamber 462, and empty particulate matter that has collected on the bottom plate 477.

Referring to FIG. 6B, the second section further includes a rotational flow director 474, for facilitating or inducing rotational flow in the gas stream entering the inlet end 470 of the rotational flow chamber 462. As used herein, the term "rotational flow" refers to a flow pattern that is generally helical, similar to the flow pattern in a cyclonic separator. However, the term "rotational flow" includes both the high speed helical flow required for cyclonic separation, and lower speed helical flow, which on its own would be insufficient to effect substantial cyclonic separation.

The rotational flow director 474 may be, for example, housed in the inlet conduit 460 and/or in the inlet end 470 of the rotational flow chamber 462. In the example shown, the rotational flow director 474 is housed in the inlet end 470 of the rotational flow chamber 462, and is mounted to the downstream end 466 of the inlet conduit 460. More specifically, the downstream end 466 of the inlet conduit includes a flared section 476, with a grate 478 mounted thereacross. The rotational flow director 474 includes a cone 480 having a tapered end 482, a flared end 484, and a conic wall 486 extending therebetween. The tapered end 482 is mounted to the grate 478. The rotational flow director 474 further includes at least one helical wing 488 extending at least partially around the conic wall 486, from the tapered end towards the flared end 484. Flue gas passing from the inlet conduit flows past the rotational flow director and takes on a rotational flow pattern in the rotational flow chamber 462.

The second section 440 further includes at least a first electrode in the gas flow path for facilitating electrostatic removal of particles from the gas stream in the rotational flow chamber 462. The first electrode may be, for example, associated with at least one of the inlet conduit 460 and the chamber wall 468. In the example shown, as will be described in further detail below, the EPC 430 includes a first electrode 490 associated with the inlet conduit 460, and a second electrode 492 associated with the chamber wall 468 and electrically insulated from the first electrode 490.

As used herein, the phrase "associated with" used with respect to either of the electrodes 490, 492 and the inlet conduit 460 may indicate that the inlet conduit 460 forms at least a part of the given electrode, and/or that the given electrode is mounted to the inlet conduit 460, and/or that inlet conduit 460 and given electrode are otherwise configured such that gas entering the rotational flow chamber 462 via the inlet conduit 460 contacts the given electrode while in the inlet conduit 460, and/or that the inlet conduit 460 and given electrode are otherwise configured such that gas exiting the inlet conduit 460 and entering the rotational flow chamber 462 contacts the given electrode as it exits the inlet conduit 460. The phrase "associated with" used with respect to either of the electrodes 490, 492 and the chamber wall 468 may indicate that the chamber wall 468 forms at least a part of the given electrode, and/or that the given electrode is mounted to the chamber wall 468, and/or that the given electrode and chamber wall 468 are otherwise configured such that gas rotationally flowing within the rotational flow chamber 462 contacts the given electrode.

Referring to FIG. 6B, in the example shown, the inlet conduit 460 forms a part of the first electrode 490. Specifically, the inlet conduit 460 includes a conductive cylinder 494. The conductive cylinder 494, the flared section 476, and the rotational flow director 474 together form the first electrode 490. The conductive cylinder 494, flared section 476, and rotational flow director 474 may, for example, be made from a metal such as aluminum. The inlet conduit 460 is electrically insulated from the remainder of the EPC 430, including the chamber wall 468 and the first cyclonic particle collector 441, with electrical insulation 494a, 494b. The electrical insulation 494a, 494b, may be, for example, polytetrafluoroethylene tape.

Referring still to FIG. 6B, in the example shown, the chamber wall 468 forms the second electrode 492. Specifically, the chamber wall 468 is electrically conductive. For example, the chamber wall 468 may be made from a metal such as aluminum. The chamber wall 468 is electrically insulated from the first electrode 490 with electrical insulation 494b, mentioned above, and from the gas outlet 473 with electrical insulation 494c.

In alternative examples, the first and/or second electrode may be of another configuration. For example, the EPC may include only a first electrode, which may be associated with the chamber wall.

The EPC may further include at least one power source (not shown), such as a high voltage DC power source, for providing an electrostatic charge to the first electrode 490 and/or second electrode 492. In some examples, the power source(s) may provide a negative charge to the first electrode 490, and a positive charge to the second electrode 492. The power source may in some examples apply a negative charge of between 5 kV and 50 kV, and a positive charge of between 5 kV and 50 kV to the second electrode. For example, the power source(s) may apply a negative charge of 30 kV to the first electrode 490, and a positive charge of 30 kV to the second electrode 492.

An example method of removing particulate matter from a gas stream will presently be described. The method will be described with respect to the removal of particulate matter from a flue gas from a combustion furnace, using EPC 430. In alternative examples, the method may be used to remove particulate matter from another type of gas stream, using a different apparatus.

In use, flue gas may be directed into the EPC gas inlet 432 from the combustion furnace. The flue gas may then flow through the first cyclonic particle collector 441, where coarse particles may be cyclonically removed from the gas stream, to generate a cyclonically treated gas stream. In some examples, the coarse particles may have an average diameter of above about 2.5 microns, with the majority of the coarse particles having an average diameter of above 5 microns.

The coarse particles may drop into and collect in the cyclone volume lower portion 450. The valve 456 may be periodically opened, for example when the EPC 430 is not in use, to empty the coarse particles from the cyclone volume lower portion 450.

After passing through the first cyclonic particle collector 441, an electrostatic charge may be applied to the cyclonically treated gas stream to generate a charged gas stream. More specifically, in some examples, the cyclonically treated gas stream may flow through the inlet conduit 460 and past the rotational flow director 474, which together serve as the first electrode 490 and carry a negative electrostatic charge. Without being limited by theory, it is believed that as the cyclonically treated gas flows past the negatively charged first electrode 490, particles in the cyclonically treated gas take on a net negative charge.

After generating the charged gas stream, fine particles may be removed from the charged gas stream by applying an opposite electrostatic charge to the charged gas stream while rotationally flowing the charged gas stream. More specifically, in some examples, as the charged gas stream flows out of the inlet conduit 460 and past the rotational flow director 474, it takes on a rotational flow pattern, and rotationally flows through the rotational flow chamber 462 from the inlet end 470 towards the outlet end 472. While the gas is rotationally flowing in the rotational flow chamber 462, a positive electrostatic charge is applied to the chamber wall 468, which forms the second electrode 492. The fine particles rotationally flow past the positively charged second electrode 492, collect on the chamber wall 468, and are removed from the charged gas stream. Without being limited by theory, it is believed that the fine particles are removed from the charged gas stream due to electrostatic attraction between the negatively charged fine particles and the positively charged chamber wall 468.

In some examples, the EPC 430 may be configured such that the gas stream flows at a first average speed in the first cyclonic particle collector 441 to cyclonically remove the coarse particles, and flows at a second average speed in the rotational flow chamber 462. The second average speed may be less than the first average speed. More specifically, the first average speed may be sufficient to effect cyclonic removal of coarse particles from the gas stream, whereas the second average speed may in some examples be generally insufficient to effect substantial cyclonic removal of fine particles from the gas stream. Instead, in some examples, the fine particles may be removed from the gas stream largely by electrostatic effects. Without being limited by theory, it is believed that the combination of a relatively large diameter in the rotational flow chamber 462, as well as the design of the rotational flow director 474, may serve to reduce the average speed of the gas in the rotational flow chamber 462. It is further believed that by reducing the average speed of the gas in the rotational flow chamber 462, re-entrainment of fine particles in the gas stream is minimized, prevented, or reduced, as the kinetic energy of the particles is insufficient for particle collisions to cause re-entrainment.

The gas stream may flow out of the rotational flow chamber 462 via the gas outlet 473, and may then optionally pass into the filter of the flue gas treatment apparatus 404.

In some examples, in order to empty the fine particles from the rotational flow chamber 462, the EPC 430 may be shut down, so that the first 490 and second 492 electrodes are no longer charged. The fine particles may then drop to the lower end of the rotational flow chamber 462, and the valve 475 may be opened in order to empty the fine particles from the rotational flow chamber 462.

Figures 7A, 7B, 7C:
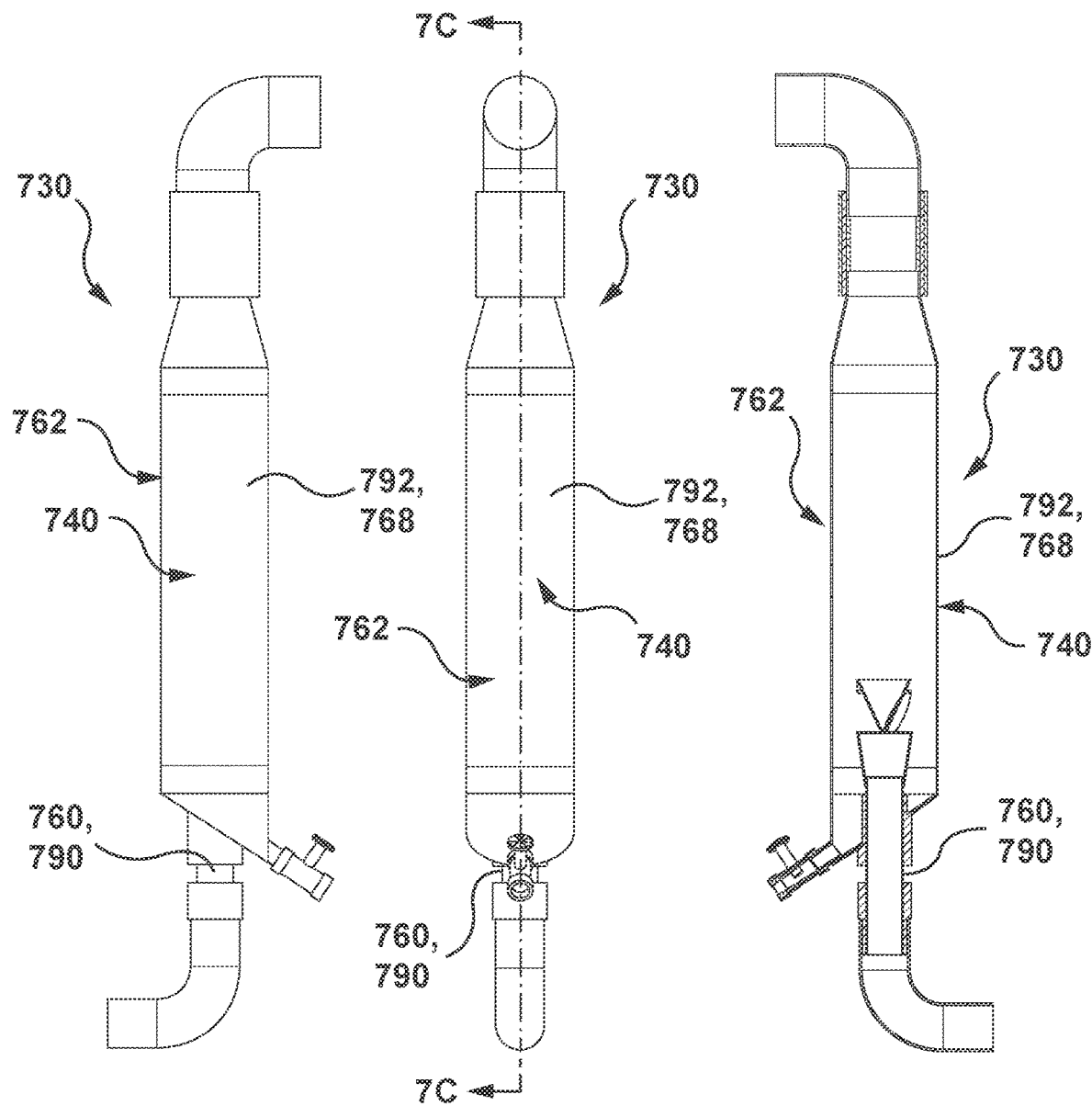
FIG. 7A is a side plan view of an alternative example particle collector.
FIG. 7B is a front plan view of the particle collector of FIG. 7A.
FIG. 7C is a cross sectional view taken along line 7C-7C in FIG. 7B.

An alternative example of a particle collector 730 is shown in FIG. 7, in which like features to FIGS. 4 to 6 will be referred to with like reference numerals, incremented by 300. The particle collector 730 is similar to the particle collector 430; however, in the particle collector 730, the first cyclonic particle collector 441 of FIGS. 4 to 6 is omitted, and the particle collector 730 includes only one section 740, which generally corresponds to the second section 440 of FIGS. 4 to 6. More specifically, in the example shown, the particle collector 730 includes an inlet conduit 760 which forms a part of a first electrode 790, and a rotational flow chamber 762 which has chamber walls 768 forming a second electrode 792. The particle collector 730 operates in a similar fashion to the second section 440 of the particle collector 430. Briefly, an electrostatic charge is applied to a gas stream to generate a charged gas stream, and particles are removed from the charged gas stream by applying an opposite electrostatic charge to the charged gas stream while rotationally flowing the charged gas stream.

In the examples described above, the particle collectors 430, 730 include two electrodes, of which the first is negatively charged and the second is positively charged. In alternative examples, the particle collectors may include only one electrode. For example, the first electrode of FIGS. 4 to 7 may be omitted, and only the chamber wall 468, 768 may serve as an electrode. In further alternative examples, the charges applied to the first and/or second electrode may be altered. For example, a positive charge may be applied to the inlet conduit, and a negative charge may be applied to the chamber wall.

Various examples of particle collectors have been described herein with reference to a flue gas treatment apparatus, and with reference to methods and apparatuses for carbon dioxide enrichment. It will be appreciated, however, that the EPCs described herein may be used in other apparatuses/methods in order to remove particulate matter from a gas, or as a standalone apparatus/method for removing particulate matter from a gas.

While the above description provides examples of one or more processes or apparatuses, it will be appreciated that other processes or apparatuses may be within the scope of the accompanying claims.

EXAMPLES

Material and Method

A wood pellet combustion furnace was installed inside a tunnel greenhouse and three different prototype flue gas treatment apparatuses were installed on the flue gas outlet (also referred to as a chimney) of the furnace. For each of them, the composition of the flue gas produced during wood pellet combustion was analysed and recorded. The specification of the furnace, wood pellets used, and testing instruments are provided in the following section.

Furnace

A biomass furnace (SBI, Caddy Alterna) was installed inside a tunnel greenhouse located on the MacDonald campus of McGill University, Quebec, Canada. The furnace was equipped with a 4 inch chimney, a 500 Watt lighter, a central computer allowing for control of the input power, which can be set to 4.98, 17.58, 23.45, 29.31 and 35.17 Kw (17 000, 60 000, 80 000, 100 000 and 120 000 Btu/hr) (PSG 2011). Based on dealer specification, this furnace has an average efficiency of 81.2% (PSG 2011).

Wood Pellets

The biomass used during the experiment was premium grade wood pellets made with 100% hardwood. As specified by the manufacturer (Valfei product inc., Quebec, Canada), the wood pellets contain no additive and chemical and produce less than 1% of ash and less than 0.5% of fines. Wood pellets have an average diameter of 0.25 inches and a length of 0.75 inches Gas Analysis The composition of the flue gas produced during wood pellet combustion and treatment of the flue gas was analysed using the TESTO 335 portable analyzer (Testo Inc., Lenzkirch, Germany). This analyser has a resolution of 100 ppb for CO, NO and $NO_2$ and a resolution of 1 ppm for $SO_2$ (Testo 2011). VOC analyses were performed using VOC detectors (Reed GD-3300) which have sensitivity of 50 ppm for methane (Reedinstrument 2013). Volatile organic compound analysis was required in order to detect the presence of ethylene which can be detrimental to plants.

Prototypes: Design and Results

Prototype 1: One Heater and One Catalytic Converter

A prototype flue gas treatment apparatus was assembled and included, in series, an air filter, a heater, a catalytic converter, and a fan that suctions the air and forces it to pass through the system.

The air filter was a fiberglass filter as described above

The heater was set at 230 degrees Celsius.

The catalytic converter was a universal type catalytic converter as described above.

The prototype was connected to the flue gas outlet of the biomass furnace. A drawing of the prototype is shown in FIGS. 8A to 8E.

Figure 9:
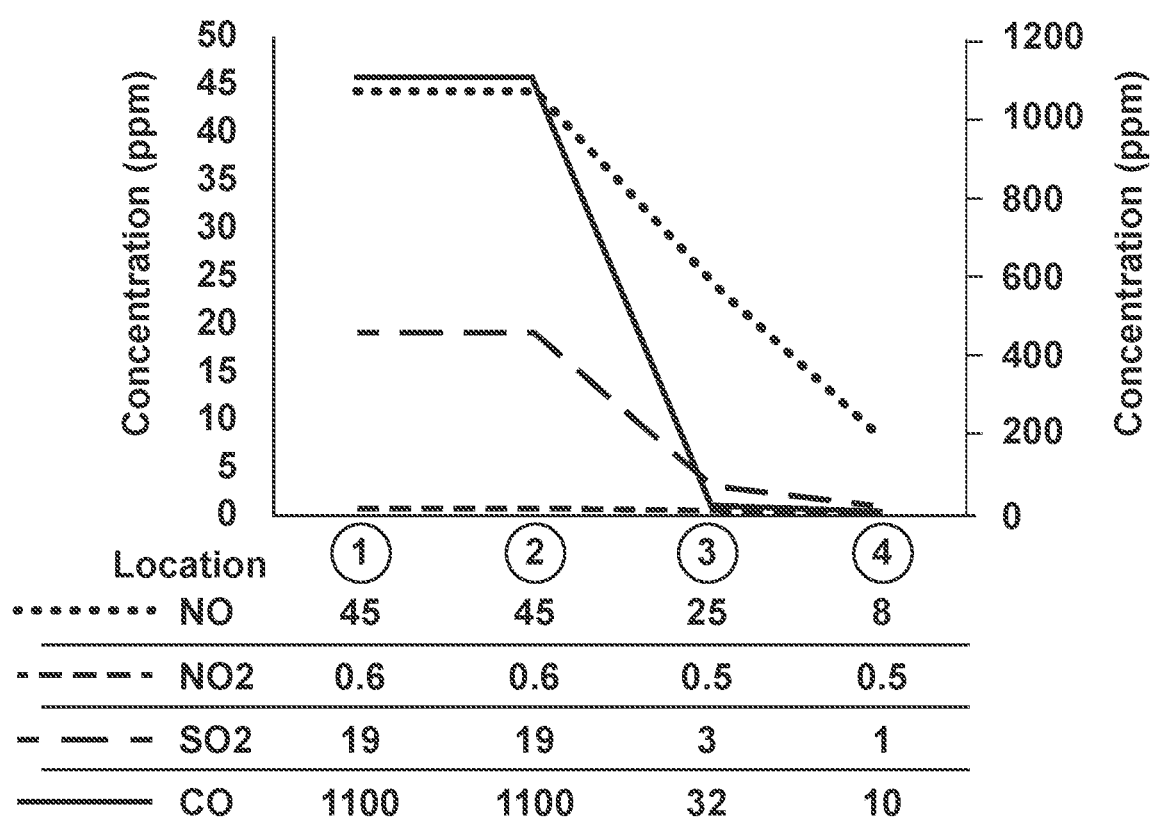
FIG. 9 is a graph showing the concentration of various gases at the points depicted in FIGS. 8B to 8E.

As can be seen in FIG. 9, the concentrations of major toxic contaminant gases at the treated gas outlet are significantly reduced.

Prototype 2: Two Heaters and Two Catalytic Converters

Prototype 1 was modified to include a second heater and a second catalytic converter. The second heater was set at 350 degrees Celsius. The second catalytic converter included a California CARB Compliant Universal Catalytic Converter sold by Magnaflow (California, USA).

An additional fan was also installed upstream of the filter to increase the air flow rate. The fan was a centrifugal fan, including a motor spaced away from the impeller, as described above. A supplementary fan was used to cool the motor.

Figure 10:
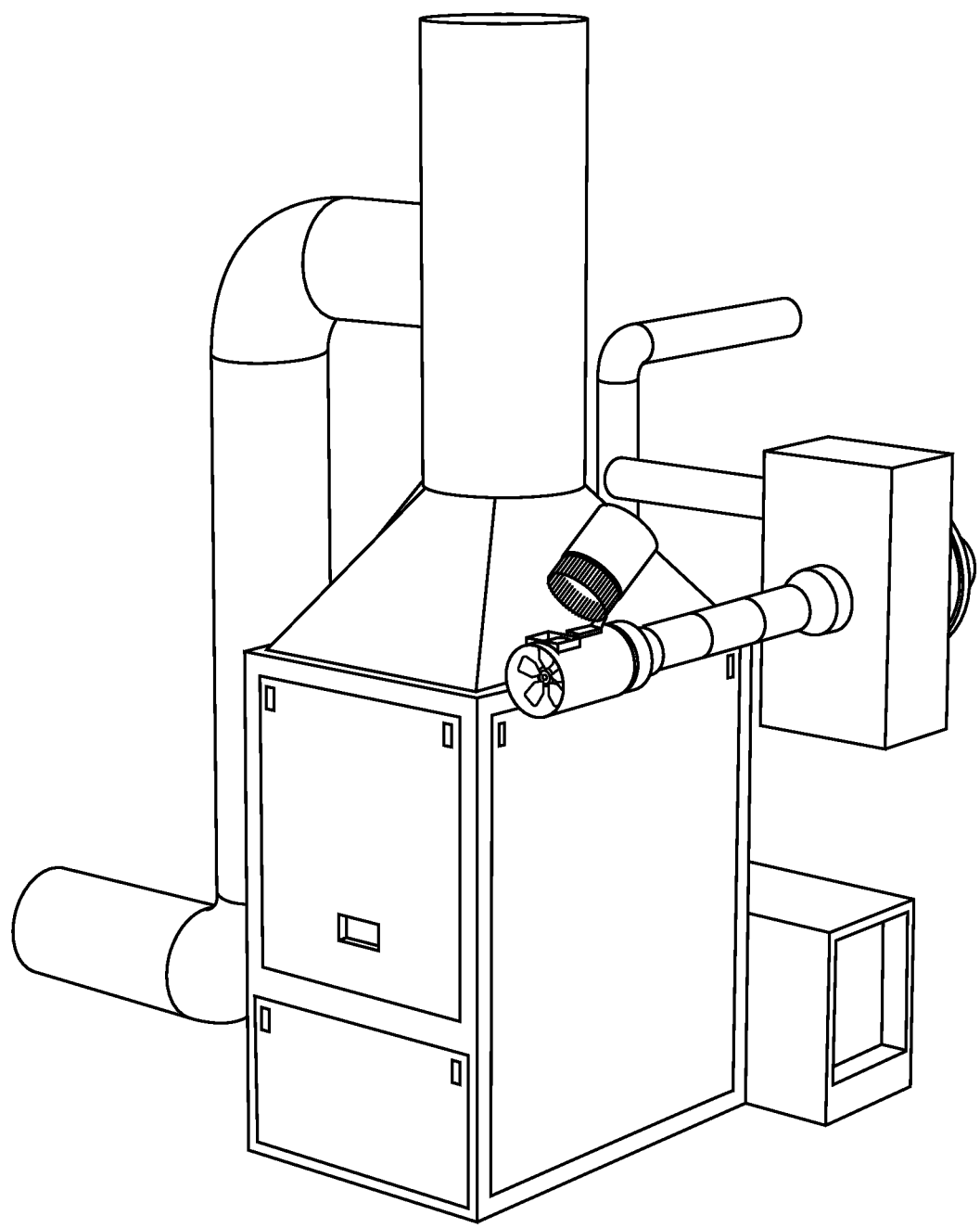
FIG. 10 is a perspective view of another prototype apparatus for carbon dioxide enrichment.

Prototype 2 was connected to the flue gas outlet of the biomass furnace. A drawing of the prototype is shown in FIG. 10.

Prototype 2 was able to reduce CO concentrations from 1100 to less than 1 ppm, NO from 70 to approximately 5.2 ppm and $SO_2$ from 19 to less than 1 ppm. Moreover, there was no visual trace of particulates exiting the system. In addition, volatile organic compounds were not detected at the exit of the system using the Reed GD-3300 analyser, which confirms that no significant amount of ethylene is released into the greenhouse.

The furnace in combination with Prototype 2 was installed in a double layer polyethylene greenhouse that has an approximate volume of 370 m³. It can be expected that this type of greenhouse will experience 0.5 air change per hour, excluding the effect of the ventilation. At maximum input power of 35.17 KW, the volumetric flow rate of treated carbon dioxide rich gas stream was, on average, 0.001 m³/s. Therefore, the naturally occurring dilution factor can be calculated using equation 1. Using this formula, it can be found that the naturally occurring dilution factor is approximately 50.

$$\text{Dilution factor} = \frac{\text{Greenhouse air exchange flow rate}}{\text{Purified flue gas flow rate}} \qquad (1)$$

Table 1 shows the concentrations of toxic contaminant gases at the exit of the flue gas treatment apparatus, as well as their theoretical concentration in the ambient air of the greenhouse. These results are satisfactory since they meet air quality criterion for greenhouse environment after dilution into the ambient air of the greenhouse.

TABLE 1

Prototype 2 emission at the exit of the flue gas treatment system

| Gases | Exit of Flue Gas Treatment System [ppm] | Ambient air of greenhouse |
|---|---|---|
| CO | ~0 (at ppm level) | <0.01ª |
| NO | 5.2 | 0.1 |
| NOx | 5.5 | 0.11 |
| $SO_2$ | ~0 (Resolution 1 ppm) | <0.01ª |
| VOC | Not detectable using Reed GD-3300 | Not detectable using Reed GD-3300 |
| Particles | Not visible | Not visible |

ªSince CO and $SO_2$ were not detected at ppm levels, the calculations were made assuming a concentration of 0.5 ppm.

Prototype 3

A prototype EPC was assembled in accordance with FIGS. 4 to 6 and connected to the flue gas outlet of the biomass furnace. The prototype was tested both with the power source on (i.e. with the electrodes charged) and the power source off (i.e. with the electrodes not charged). When the power source was on, a negative charge of 30 kV was applied to the first electrode, and a positive charge of 30 kV was applied to the second electrode.

Figure 11:
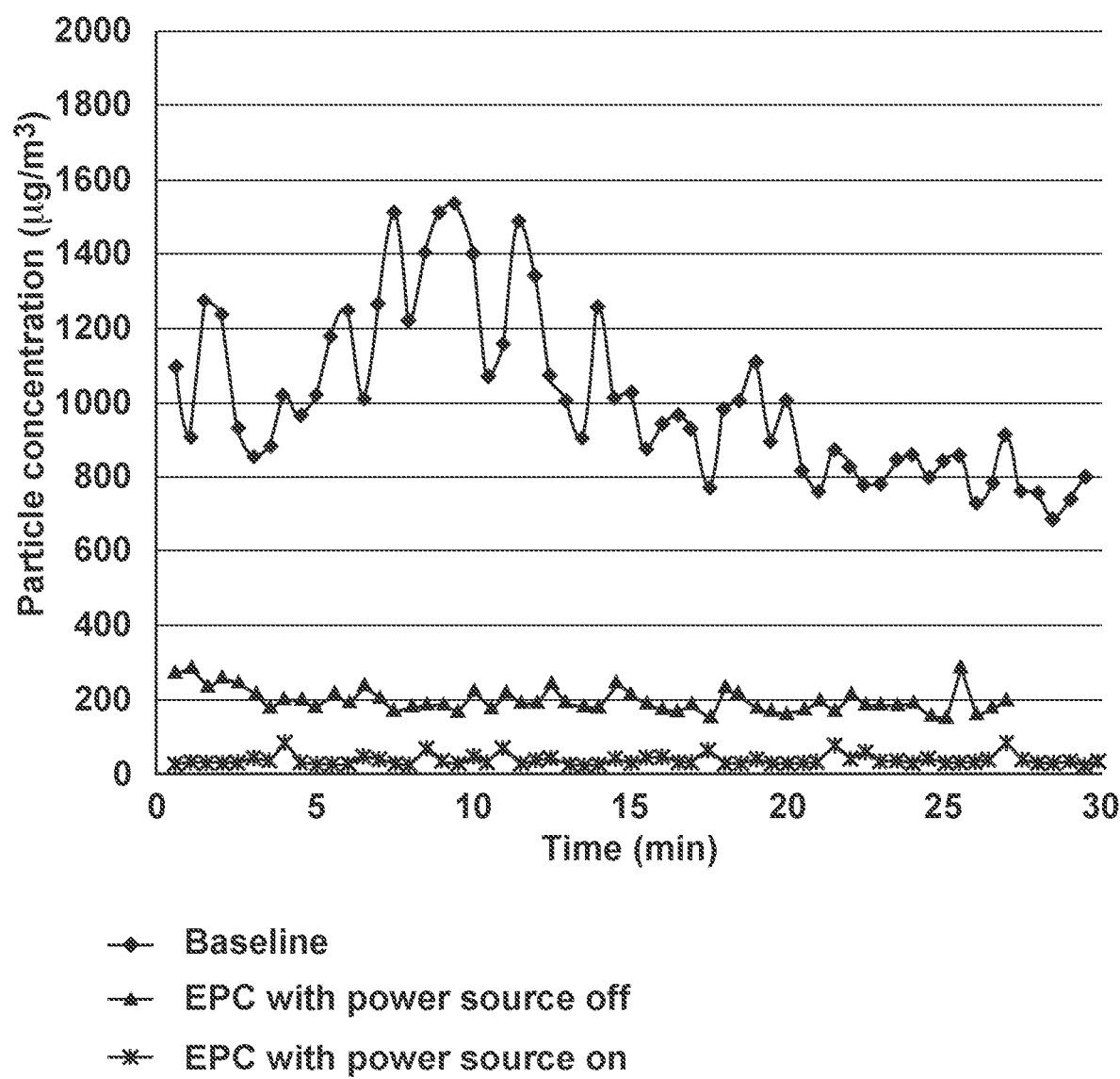
FIG. 11 is a graph showing the collection efficiency of a prototype particle collector in accordance with FIGS. 4 to 6.

The collection efficiency is shown in FIG. 11, and is compared to the baseline particle concentration in the flue gas coming from the biomass furnace, with no particle collection device connected thereto. The flue gas entering the particle analyzer was diluted by a factor of 10 in order to cool the gas and to meet operational requirements of the particle analyzer. The average baseline concentration of particles in the diluted flue gas (i.e. without the EPC) was 1008.3 micrograms per metre cubed. The average concentration of particles in the diluted flue gas after passing through the EPC with the power source off was 205.2 micrograms per metre cubed. The average concentration of particles in the diluted flue gas after passing through the EPC with the power source on was 44.5 micrograms per metre cubed. The efficiency of the EPC was thus determined to be approximately 80% with the power source off, and 96% with the power source on.

It is believed that the particle removal that occurred with the power source off is due to cyclonic effects.

The invention claimed is:

1. An electrocyclonic particle collector (EPC) for removing particulate matter from a gas, comprising:
   a) an EPC gas inlet, an EPC gas outlet, and an EPC gas flow path between the EPC gas inlet and the EPC gas outlet;
   b) a first section downstream of the EPC gas inlet and comprising a first cyclonic particle collector in the EPC gas flow path for cyclonically removing particles from the gas; and
   c) a second section in series with the first section and comprising a rotational flow chamber in the EPC gas flow path, at least a first electrode in the EPC gas flow path for facilitating electrostatic removal of particles from the gas stream in the rotational flow chamber, an inlet conduit extending from the first cyclonic particle collector to the rotational flow chamber, a grate mounted across the downstream end of the inlet conduit, and a rotational flow director for facilitating rotational flow in the rotational flow chamber, wherein the rotational flow director is mounted to the grate and housed in the rotational flow chamber.

2. The EPC of claim 1, wherein the first electrode is associated with the inlet conduit.

3. The EPC of claim 2, wherein the inlet conduit comprises a conductive cylinder, and the conductive cylinder forms at least a part of the first electrode.

4. The EPC of claim 1, wherein the inlet conduit and the rotational flow chamber extend along a common longitudinal axis.

5. The EPC of claim 4, wherein the first cyclonic particle collector extends along the longitudinal axis.

6. The EPC of claim 1, wherein the rotational flow director comprises a cone having a tapered end, a flared end, and a conic wall extending therebetween, and the tapered end is mounted to the grate.

7. The EPC of claim 6, further comprising at least one helical wing extending along the conic wall.

8. The EPC of claim 1, further comprising a second electrode in the gas flow path and electrically insulated from the first electrode.

9. The EPC of claim 8, wherein the rotational flow chamber comprises a chamber wall, and the chamber wall forms the second electrode.

10. The EPC of claim 8, further comprising at least one power source providing a negative charge to the first electrode and a positive charge to the second electrode.

11. The EPC of claim 1, wherein the rotational flow chamber comprises a chamber wall, and the inlet conduit is electrically insulated from the chamber wall and from the first cyclonic particle collector.

12. The EPC of claim 1, wherein the rotational flow chamber comprises a chamber wall, and the chamber wall forms the first electrode.

13. The EPC of claim 1, wherein at least a first portion of the inlet conduit is within the first cyclonic particle collector.

14. The EPC of claim 13, wherein at least a second portion of the inlet conduit is between the first cyclonic particle collector and the rotational flow chamber and at least a third portion of the inlet conduit is within the rotational flow chamber.

15. The EPC of claim 1 wherein the rotational flow chamber is positioned above the first cyclonic particle collector.

16. The EPC of claim 1, wherein the first cyclonic particle collector has a first diameter, and the rotational flow chamber has a second diameter, and the second diameter is greater than the first diameter.

* * * * *